(12) United States Patent
Takahashi et al.

(10) Patent No.: US 12,395,075 B2
(45) Date of Patent: Aug. 19, 2025

(54) ELECTRONIC APPARATUS AND CONTROL METHOD

(71) Applicant: CANON KABUSHIKI KAISHA, Tokyo (JP)

(72) Inventors: Hikaru Takahashi, Kanagawa (JP); Yasuhito Kigure, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 18/581,646

(22) Filed: Feb. 20, 2024

(65) Prior Publication Data

US 2024/0283358 A1   Aug. 22, 2024

(30) Foreign Application Priority Data

Feb. 21, 2023 (JP) ................. 2023-025530
Nov. 28, 2023 (JP) ................. 2023-201026

(51) Int. Cl.
*H02M 3/04* (2006.01)

(52) U.S. Cl.
CPC ..................... *H02M 3/04* (2013.01)

(58) Field of Classification Search
CPC ............ H02M 3/04; H02M 1/10; H02M 1/32; H02M 3/155; G06F 1/263; H02J 7/0068
USPC ...................................... 307/125
See application file for complete search history.

(56) References Cited

U.S. PATENT DOCUMENTS

2016/0197481 A1* 7/2016 Nishigai ............. H02J 1/12
324/140 D

FOREIGN PATENT DOCUMENTS

JP       2020057119 A    4/2020

* cited by examiner

*Primary Examiner* — Rexford N Barnie
*Assistant Examiner* — Xuan Ly
(74) *Attorney, Agent, or Firm* — Cowan, Liebowitz & Latman, P.C.

(57) ABSTRACT

An apparatus connects to a power source device and an external apparatus, controls power input from the power source device and power output to the external apparatus, steps up or steps down voltage of the power input from the power source device, and sets a path through which the power input from the power source device is output to the external apparatus. The apparatus acquires attribute information of the power source device and required voltage of the external apparatus and, performs control, based on the attribute information and the required voltage, to switch between a path through which the power input from the power source device is output to the external apparatus via a voltage conversion, and a path through which the power input from the power source device is output to the external apparatus not via the voltage conversion.

14 Claims, 9 Drawing Sheets

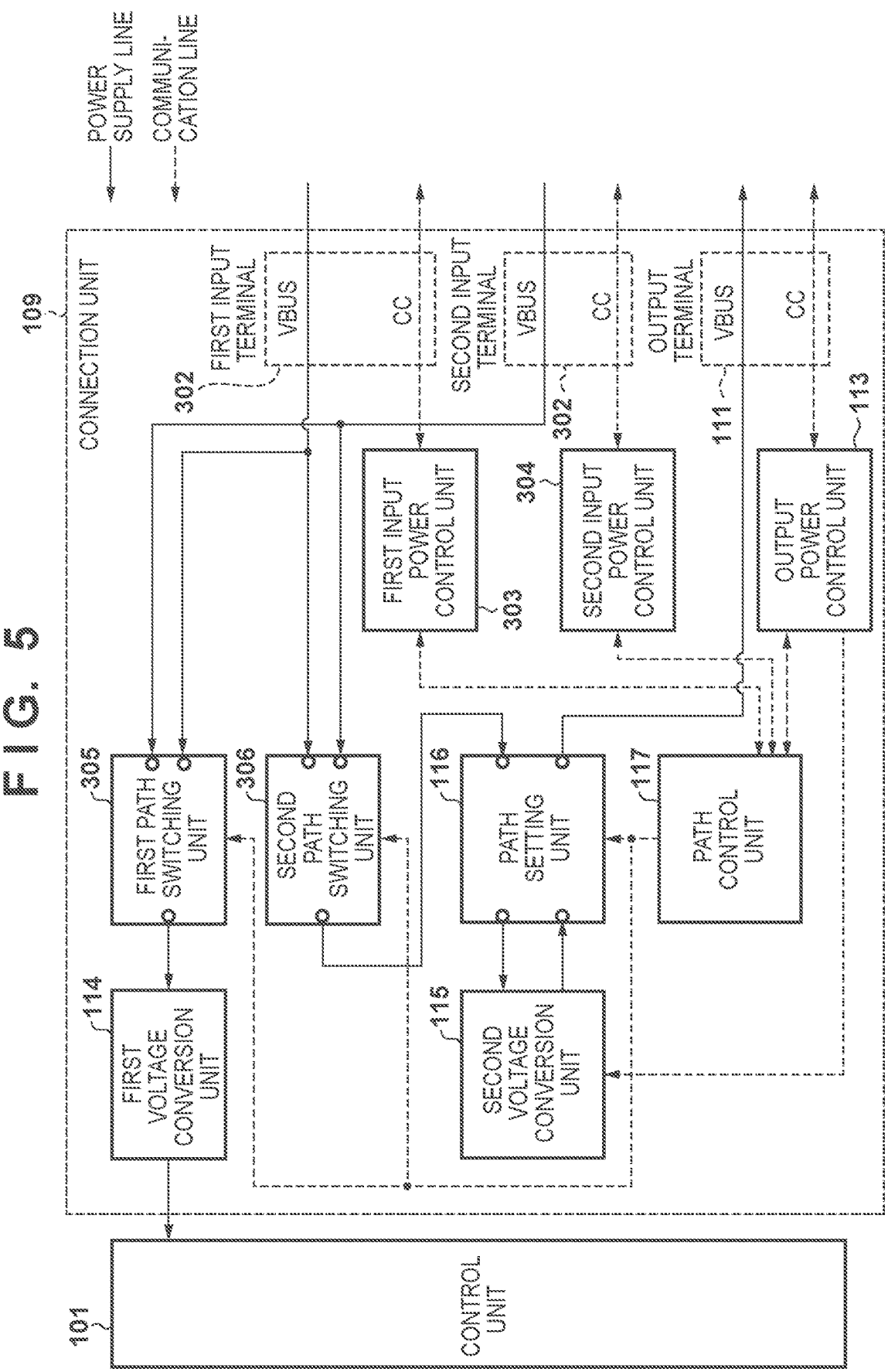

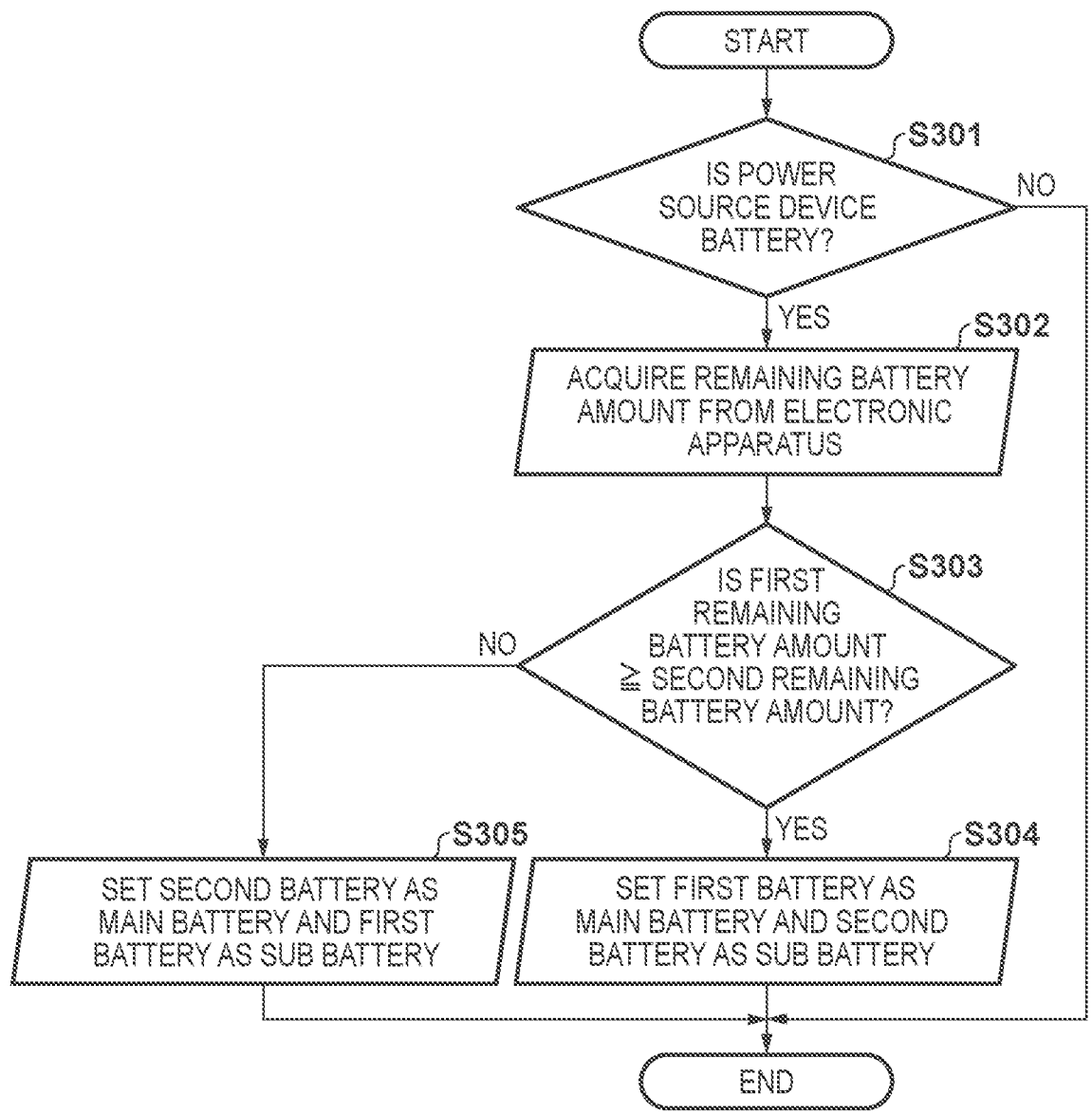

ELECTRONIC APPARATUS AND CONTROL METHOD

BACKGROUND OF THE INVENTION

Field of the Invention

The present invention relates to a system that receives power from a power supply device and supplies power to a power receiving device.

Description of the Related Art

According to the Universal Serial Bus (USB) Power Delivery (PD) standard, power from 15 W to 100 W can be supplied from a source device to a sink device at a voltage from 5V to 20V by performing negotiation between the source device and the sink device. Therefore, power can be supplied and received between an electronic apparatus such as a Personal Computer (PC) complying with the USB PD standard and an external apparatus such as an external monitor which is a USB connected to the PC.

An electronic apparatus includes an input terminal to which power is input from a power source device and an output terminal from which power is supplied to an external apparatus. The input terminal is connected to a commercial power source, a battery, or the like in order to receive power required for operating the electronic apparatus. The output terminal is connected to an external monitor or the like that needs power supply. The electronic apparatus converts the power supplied from the power source device into a voltage suitable for operating the external apparatus, and outputs the power. Japanese Patent Laid-Open No. 2020-057119 describes a technique that suppresses reduction of conversion efficiency in a case where a DC voltage which is converted by an AC-DC converter is converted by a DC-DC converter, according to the USB PD standard.

However, the technique described in Japanese Patent Laid-Open No. 2020-057119 is limited to a case where an electronic apparatus is receiving power from a commercial power source and the operation mode of the electronic apparatus is the power saving mode and, when the electronic apparatus is receiving power from the battery, power loss by the voltage conversion may cause reduction of the operating time of the electronic apparatus, which may reduce usability.

SUMMARY OF THE INVENTION

The present invention has been made in consideration of the aforementioned problems, and realizes techniques that suppress power loss by the power conversion in outputting the power.

In order to solve the aforementioned problems, the present invention provides an electronic apparatus comprising: a connection unit that connects to a power source device and an external apparatus; a power control unit that controls power input from the power source device and power output to the external apparatus; a voltage conversion unit that steps up or steps down voltage of the power input from the power source device; a setting unit that sets a path through which the power input from the power source device is output to the external apparatus; and a control unit that acquires attribute information of the power source device and required voltage of the external apparatus and, performs control, based on the attribute information and the required voltage, to switch between a path through which the power input from the power source device is output to the external apparatus via the voltage conversion unit, and a path through which the power input from the power source device is output to the external apparatus not via the voltage conversion unit.

In order to solve the aforementioned problems, the present invention provides a method of controlling an electronic apparatus, wherein the electronic apparatus includes a connection unit that connects to a power source device and an external apparatus; a power control unit that controls power input from the power source device and power output to the external apparatus; a voltage conversion unit that steps up or steps down voltage of the power input from the power source device; and a setting unit that sets a path through which the power input from the power source device is output to the external apparatus, wherein the method comprises: acquiring attribute information of the power source device and a required voltage of the external apparatus; and, controlling, based on the attribute information and the required voltage, to switch between a path through which the power input from the power source device is output to the external apparatus via the voltage conversion unit, and a path through which the power input from the power source device is output to the external apparatus not via the voltage conversion unit.

According to the present invention, power loss by the voltage conversion in outputting the power can be suppressed.

Further features of the present invention will become apparent from the following description of exemplary embodiments (with reference to the attached drawings).

BRIEF DESCRIPTION OF THE DRAWINGS

FIG. 5 is a block diagram exemplifying a configuration of a connection unit according to the second embodiment;

FIG. 7 is a flowchart exemplifying control processing according to a third embodiment.

DESCRIPTION OF THE EMBODIMENTS

Figure 1:
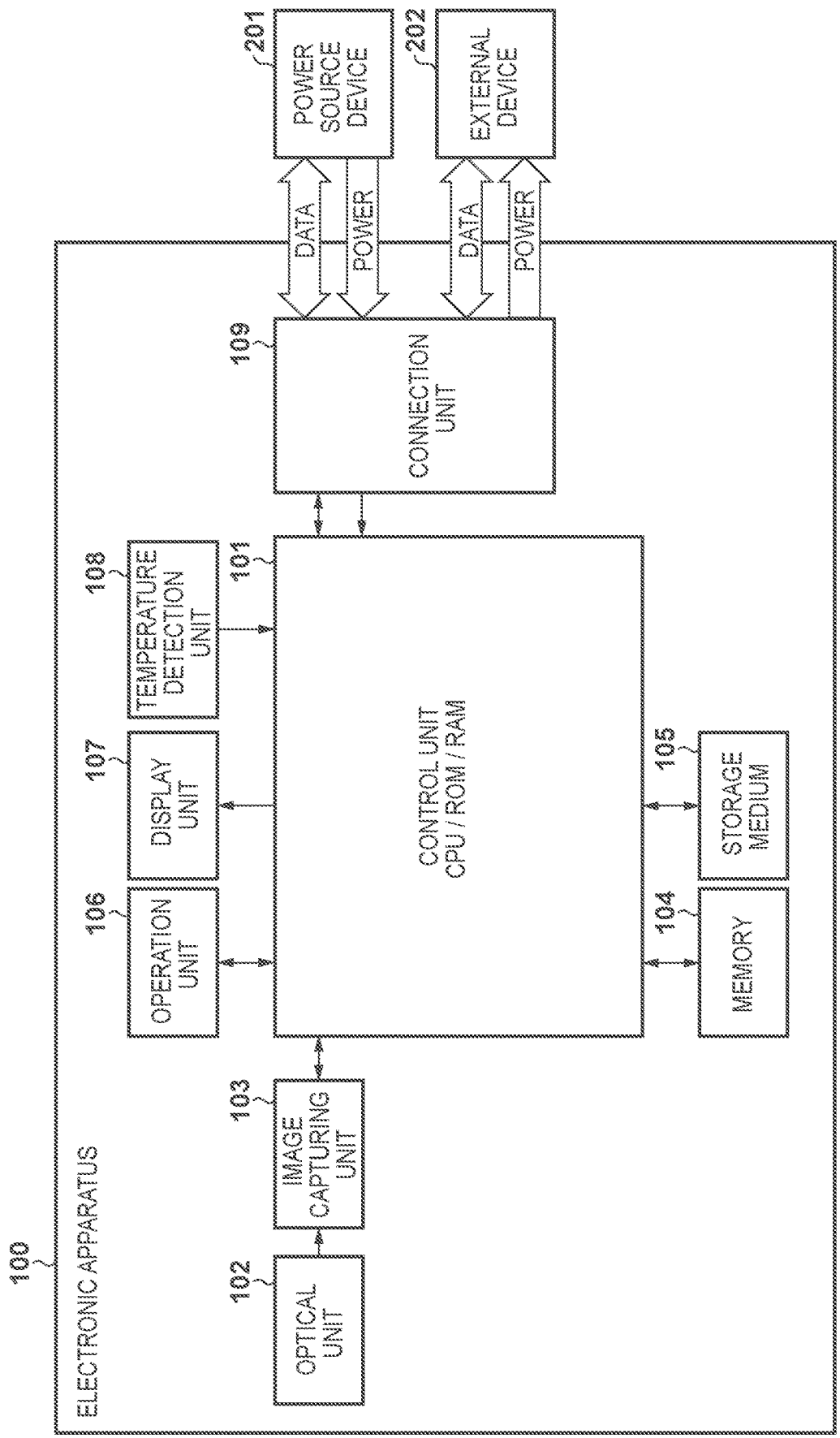
FIG. 1 is a block diagram exemplifying a configuration example of an electronic apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the present embodiment, an electronic apparatus receives power from a power supply device such as a commercial power source or a battery, operates as a source device complying with the Universal Serial Bus (USB) Power Delivery (PD) standard, and supplies power to a sink device. In addition, a power receiving device operates as a sink device complying with the USB PD standard and receives power from the source device. According to the USB PD standard, the source device can supply power from 15 W to 100 W to the sink device at a voltage from 5V to 20V.

First Embodiment

A first embodiment will be described first with reference to FIG. 1 to FIG. 3.

In the first embodiment, an electronic apparatus 100 is an image capturing apparatus such as a digital camera that can capture video such as still images or moving images. Here, the electronic apparatus 100 is not limited to a digital camera and may be a personal computer (notebook PC or tablet PC), a smartphone, a web camera such as a surveillance camera, a medical camera, or the like. The same goes for a second embodiment described below.

A control unit 101 includes a processor (CPU) that performs arithmetic operation processing and control processing of the electronic apparatus 100, a non-volatile memory (ROM) storing programs to be executed by the processor, and a work memory (RAM) to which programs read from the nonvolatile memory, constants and variables for executing the programs, and the like are loaded. The control unit 101 controls each component of the electronic apparatus 100 described below by loading, to the RAM, a program that is stored in the ROM and executing the programs.

An optical unit 102 includes a lens that forms a subject image on an image sensor of an image capturing unit 103. The optical unit 102 includes a lens group including a zoom lens or a focus lens, and a shutter having a diaphragm function.

The image capturing unit 103 includes an image sensor including a CCD or a CMOS that converts the subject image into an electrical signal, and an A/D converter that converts an analog image signal output from the image sensor into a digital signal. The image capturing unit 103, under control by the control unit 101, converts the subject image formed by the lens included in the optical unit 102 into an electrical signal by the image sensor, performs noise reduction processing or the like, and outputs image data constituted by the digital signals.

The control unit 101 performs resizing processing such as pixel interpolation and reduction, as well as color conversion processing, on image data captured by the image capturing unit 103. The control unit 101 performs predetermined arithmetic operation processing using the image data captured by the image capturing unit 103, and performs Automatic Focusing (AF) processing and Automatic Exposure (AE) processing by controlling the focus lens, the diaphragm, and the shutter of the image capturing unit 103 based on the arithmetic operation result.

A memory 104 stores image data captured by the image capturing unit 103 or data for image displaying to be displayed on a display unit 107. The memory 104 has a sufficient storage capacity for storing a predetermined number of still images, or moving images and sound of predetermined time.

A storage medium 105 may be a memory card, a Hard Disk Drive (HDD), a Solid State Drive (SSD) or the like for storing captured still images or moving images.

An operation unit 106 is an operation member such as a switch, a button, or a touch panel that accepts, and notifies the control unit 101 of, various operations from a user. The operation unit 106 includes a shutter button, a mode switch, a power switch, and a touch sensor. The touch sensor is integrally formed with the display surface of the display unit 107, and can detect contact (touch operation) on the display surface (operation surface of the touch panel) of the display unit 107.

The display unit 107 includes a liquid crystal panel, an organic EL panel, or the like, and displays images and various types of information in a manner visible to the user. The display unit 107 has an Electronic View Finder (EVF) function of displaying a live view image captured by the image capturing unit 103, a captured still image, or a moving image under recording.

A temperature detection unit 108 includes a temperature sensor such as a thermistor that detects the temperature of each component of the electronic apparatus 100. The temperature detection unit 108 is disposed, for example, in the vicinity of the control unit 101 or the image capturing unit 103 which is a device that generates heat (referred to as a heat source device in the following) disposed within the housing of the electronic apparatus 100. The control unit 101 calculates a difference between a temperature information detected by the temperature detection unit 108 and an upper limit temperature preliminarily stored in the memory 104, and calculates, based on the difference, the temperature or the time until the electronic apparatus 100 stops operation.

A connection unit 109 is an interface complying with, for example, the USB PD standard for connecting the electronic apparatus 100 to a power source device 201 and an external apparatus 202. The connection unit 109 can perform data communication as well as power transmission and reception with the power source device 201 and the external apparatus 202 that are complying with the USB PD standard. The power source device 201 is a wiring plug connector referred to as an electrical outlet (commercial power source, in the following) or a battery, for example, which supplies power to the electronic apparatus 100. The battery includes a primary battery such as an alkaline battery or a lithium battery, and a secondary battery such as an NiCd battery, an NiMH battery, or a lithium ion battery. The external apparatus 202 is an external monitor, for example, which receives power from the electronic apparatus 100.

Here, the power source device 201 that supplies power to the electronic apparatus 100 is a power supply device in relation to the electronic apparatus 100, in this case the electronic apparatus 100 serves as a power receiving device that receives power from the power source device 201. In addition, the electronic apparatus 100 that supplies power to the external apparatus 202 serves as a power supply device in relation to the external apparatus 202, and the external apparatus 202 serves as a power receiving device that receives power from the electronic apparatus 100.

Figure 2:
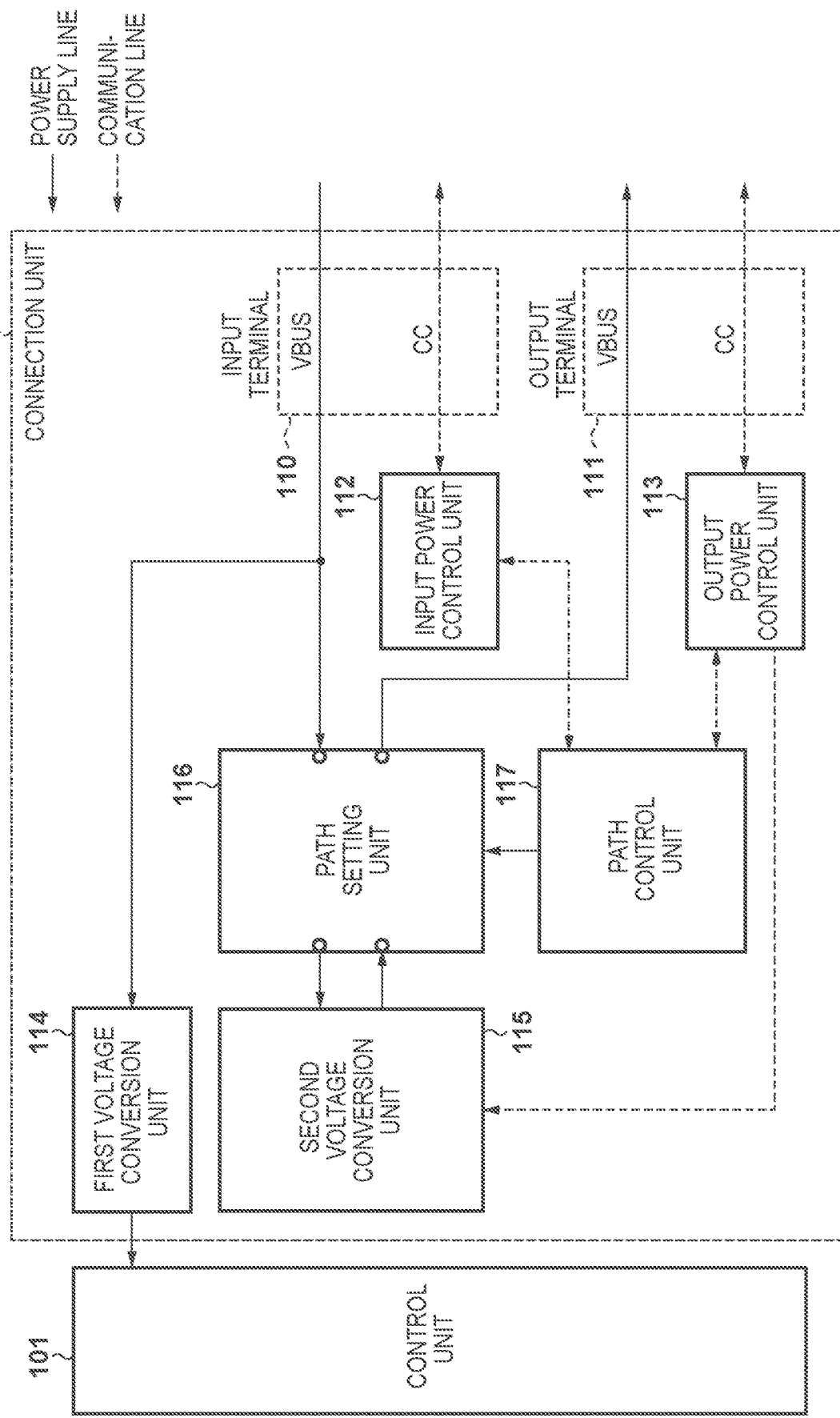
FIG. 2 is a block diagram exemplifying a configuration example of a connection unit according to the first embodiment.

FIG. 2 is a block diagram exemplifying a configuration example of the connection unit 109 of the electronic apparatus 100 according to the first embodiment.

The input terminal 110 and the output terminal 111 are USB connectors, for example, which can be connected to the USB connectors of the power source device 201 and the external apparatus 202 via cables or the like. The input terminal 110 and the output terminal 111 are USB Type-C connectors corresponding to USB 3.1, which include a CC line for data communication and a VBUS line for power transmission and reception.

An input power control unit 112 and an output power control unit 113 are USB PD controllers, for example, which can perform communication (negotiation) with the power source device 201 and the external apparatus 202 that are complying with the USB PD standard, and control the input voltage and the output voltage. The input power control unit 112 and the output power control unit 113 may change the voltage in receiving power from the power source device 201 according to the operation mode of the electronic apparatus 100, or change the voltage in supplying power according to the required voltage of the external apparatus 202. Furthermore, the input power control unit 112 and the output power control unit 113 can communicate attribute information of the power source device 201 or the required voltage of the external apparatus 202 to the control unit 101 of the electronic apparatus 100.

A first voltage conversion unit 114 and a second voltage conversion unit 115 are DC-DC converters that step up or step down the voltage input from the input terminal 110, for example, to convert into a predetermined voltage. The first voltage conversion unit 114 converts power (input voltage) input to the input terminal 110 into a voltage required for operating a component of the electronic apparatus 100. The second voltage conversion unit 115 converts the input voltage of the input terminal 110 into a voltage, such as a required voltage of the external apparatus 202, which is output from the output terminal 111.

A path setting unit 116 is a switching circuit, for example, which switches power paths between the input terminal 110 and the output terminal 111. The path setting unit 116 can switch to a path through which the input voltage of the input terminal 110 is converted into a predetermined voltage by the second voltage conversion unit 115 and output to the output terminal 111, or to a path through which the input voltage of the input terminal 110 is output to the output terminal 111 without being converted into a predetermined voltage by the second voltage conversion unit 115. Note that, in the first embodiment, a case where the input voltage is output after the voltage conversion by the voltage conversion unit is described as "via the voltage conversion unit", and a case where the input voltage is output without the voltage conversion by the voltage conversion unit is described as "not via the voltage conversion unit". The same goes for the second embodiment described below.

The path control unit 117 includes a processor (CPU) that performs arithmetic operation processing and control processing of the electronic apparatus 100, a non-volatile memory (ROM) storing programs to be executed by the processor, and a work memory (RAM) to which programs read from the nonvolatile memory, constants and variables for executing the programs, and the like are loaded. The path control unit 117 performs control of the path setting unit 116 based on information acquired from the input power control unit 112 and the output power control unit 113. The path control unit 117 may be implemented by dedicated hardware, or may be implemented as a part of the function of the control unit 101.

Figure 3:
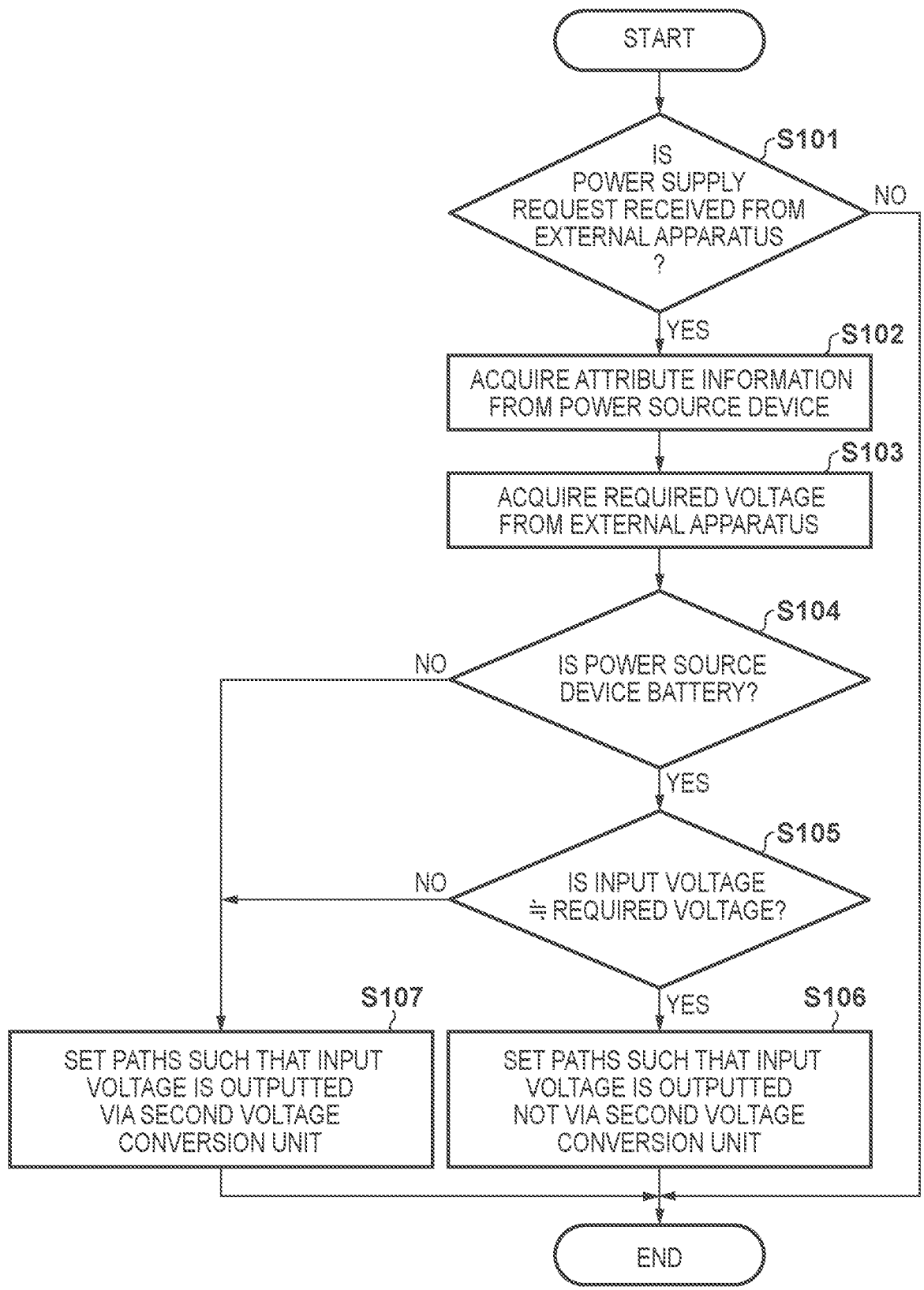
FIG. 3 is a flowchart exemplifying control processing according to the first embodiment.

FIG. 3 is a flowchart exemplifying power source control processing by the electronic apparatus 100 according to the first embodiment.

The power source control processing according to the first embodiment is realized by the path control unit 117 executing a program stored in the ROM and controlling the path setting unit 116. Note that, at the start of the processing of FIG. 3, the electronic apparatus 100 is connected to the power source device 201 and the external apparatus 202 that are complying with the USB PD standard.

In step S101, the path control unit 117 determines whether or not a power supply request of the external apparatus 202 is received from the output power control unit 113. When the path control unit 117 determines that a power supply request of the external apparatus 202 is received from the output power control unit 113, the path control unit 117 advances the processing to step S102. When the path control unit 117 determines that a power supply request of the external apparatus 202 is not received from the output power control unit 113, the path control unit 117 terminates the processing.

In step S102, the path control unit 117 communicates with the input power control unit 112 to acquire attribute information of the power source device 201. The attribute information includes information required for determining whether the power source device 201 is a commercial power source or a battery.

In step S103, the path control unit 117 communicates with the output power control unit 113 to acquire the required voltage of the external apparatus 202.

Here, the processing order of steps S102 and S103 may be reversed.

In step S104, the path control unit 117 determines whether or not the power source device 201 connected to the input terminal 110 is a battery, based on the attribute information of the power source device 201 acquired in step S102. When the path control unit 117 determines that the power source device 201 connected to the input terminal 110 is a battery, the path control unit 117 advances the processing to step S105. When the path control unit 117 determines that the power source device 201 connected to the input terminal 110 is not a battery, the path control unit 117 advances the processing to step S107.

In step S105, the path control unit 117 determines whether or not the input voltage of the input terminal 110 corresponds to the required voltage of the external apparatus 202, based on the required voltage of the external apparatus 202 acquired in step S103. When the path control unit 117 determines that the input voltage of the input terminal 110 corresponds to the required voltage of the external apparatus 202, the path control unit 117 advances the processing to step S106. When the path control unit 117 determines that the input voltage of the input terminal 110 does not correspond to the required voltage of the external apparatus 202, the path control unit 117 advances the processing to step S107. Here, a case where the input voltage of the input terminal 110 corresponds to the required voltage of the external apparatus 202 refers to, for example, a case where the input voltage of the input terminal 110 and the required voltage of the external apparatus 202 are equivalent, or a case where the difference between the input voltage of the input terminal 110 and the required voltage of the external apparatus 202 is equal to or less than a predetermined threshold. The same goes for the second embodiment described below.

In step S106, the path control unit 117 controls the path setting unit 116 to switch to a path through which the input voltage of the input terminal 110 is output from the output terminal 111 not via the second voltage conversion unit 115.

In step S107, the path control unit 117 controls the path setting unit 116 to switch a path such that the input voltage of the input terminal 110 is output from the output terminal 111 via the second voltage conversion unit 115.

According to the first embodiment, as has been described above, the input voltage of the input terminal 110 is output from the output terminal 111 without performing voltage conversion by the second voltage conversion unit 115, in a case where the power source device 201 supplying power to the electronic apparatus 100 is a battery and the input voltage of the input terminal 110 corresponds to the required voltage of the external apparatus 202. Accordingly, it is possible to suppress power loss due to voltage conversion in outputting the power and reduction of the operating time of the electronic apparatus 100, in a case where the power source of the electronic apparatus 100 is the battery, and therefore it is possible to suppress reduction of the usability.

Second Embodiment

Next, the second embodiment will be described with reference to FIGS. 4, 5, 6A and 6B.

In the following, the same configurations described in the first embodiment are provided with the same reference signs, and the description thereof will be omitted.

Figure 4:
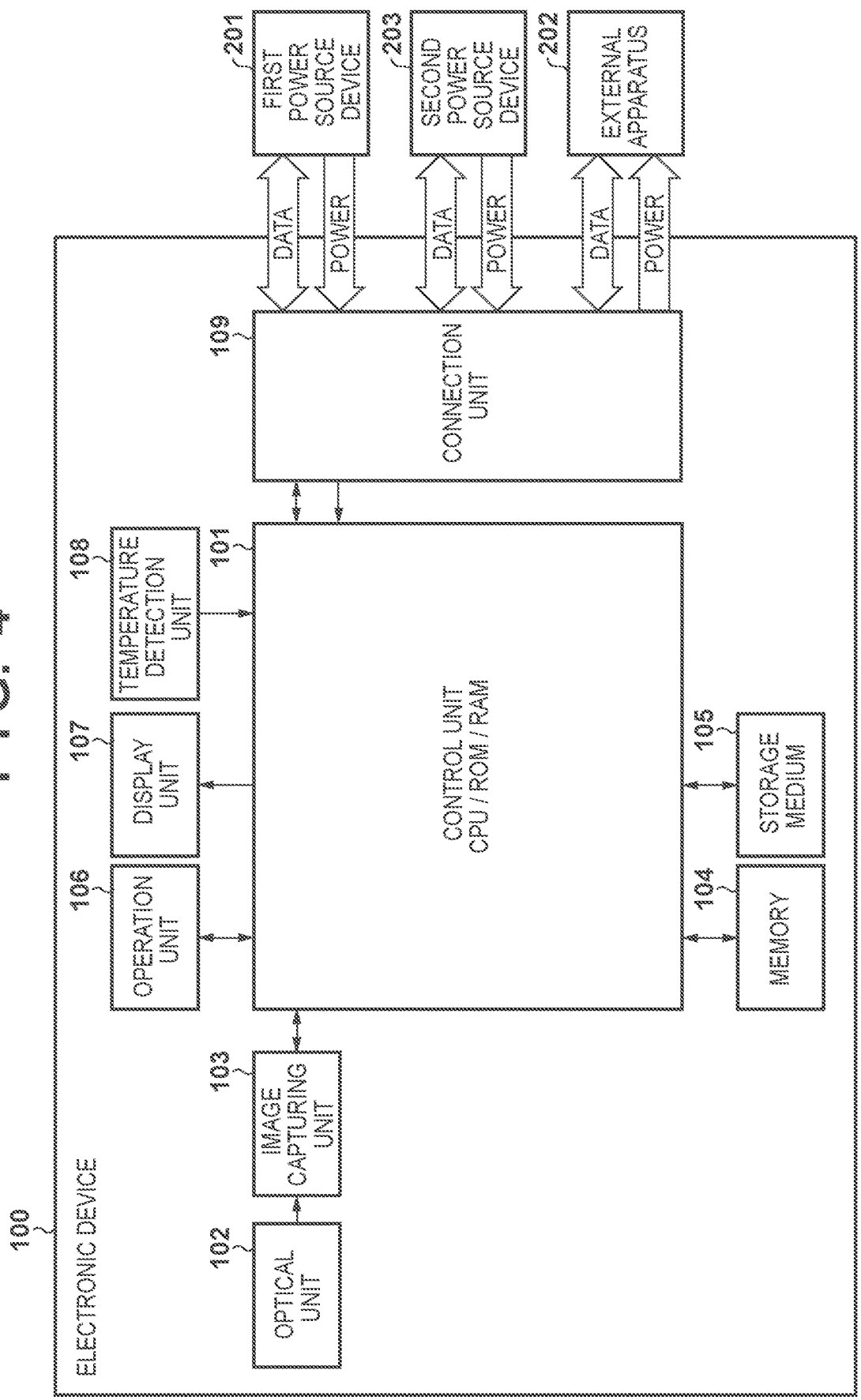
FIG. 4 is a block diagram exemplifying a configuration example of an electronic apparatus according to a second embodiment.

FIG. 4 is a block diagram exemplifying a configuration example of the electronic apparatus 100 according to the second embodiment.

A second power source device 203 is a device complying with a USB PD standard, which is a different device from the power source device 201 according to the first embodiment (referred to as a first power source device in order to distinguish from the second power source device), and is connected to the electronic apparatus 100 to be able to perform data communication as well as power transmission and reception. The second power source device 203 is a commercial power source or a battery, which supplies power to the electronic apparatus 100.

Here, the first power source device 201 and the second power source device 203 that supply power to the electronic apparatus 100 are power supply devices in relation to the electronic apparatus 100, in this case the electronic apparatus 100 serves as a power receiving device that receives power from the first power source device 201 and the second power source device 203. In addition, the electronic apparatus 100 that supplies power to the external apparatus 202 serves as a power supply device in relation to the external apparatus 202, and the external apparatus 202 serves as a power receiving device that receives power from the electronic apparatus 100.

FIG. 5 is a block diagram exemplifying a configuration example of the connection unit 109 of the electronic apparatus 100 according to the second embodiment.

A first input terminal 301 and a second input terminal 302 are USB connectors, for example, which can be connected to the USB connectors of the first power source device 201 and the second power source device 203 via cables or the like. The first input terminal 301 and the second input terminal 302 are USB Type-C connectors corresponding to USB 3.1, which include a CC line for data communication and a VBUS line for power transmission and reception.

A first input power control unit 303 and a second input power control unit 304 are USB PD controllers, for example, which can perform communication (negotiation) with the first power source device 201 and the second power source device 203 that are complying with the USB PD standard, and control the input voltage. The first input power control unit 303 and the second input power control unit 304 change voltages in receiving power from the first power source device 201 and the second power source device 203 according to the operation mode of the electronic apparatus 100. Furthermore, the first input power control unit 303 and the second input power control unit 304 can communicate attribute information of the first power source device 201 and the second power source device 203 to the control unit 101 of the electronic apparatus 100.

A first path switching unit 305 is a switching circuit, for example, which switches power paths between the first input terminal 301, the second input terminal 302, and the first voltage conversion unit 114. The first path switching unit 305 can switch to a path through which a voltage input from the first input terminal 301 (first input voltage) is output to the first voltage conversion unit 114, or to a path through which a voltage input from the second input terminal 302 (second input voltage) is output to the first voltage conversion unit 114.

The second path switching unit 306 is a switching circuit, for example, which switches power paths between the first input terminal 301, the second input terminal 302, and the path setting unit 116. The second path switching unit 306 can switch to a path through which the first input voltage of the first input terminal 301 is output to the path setting unit 116, or to a path through which the second input voltage of the second input terminal 302 is output to the first voltage conversion unit 114. The path control unit 117 performs control of the first path switching unit 305 and the second path switching unit 306, based on information acquired from the first input power control unit 303 and the second input power control unit 304.

Figure 6A:
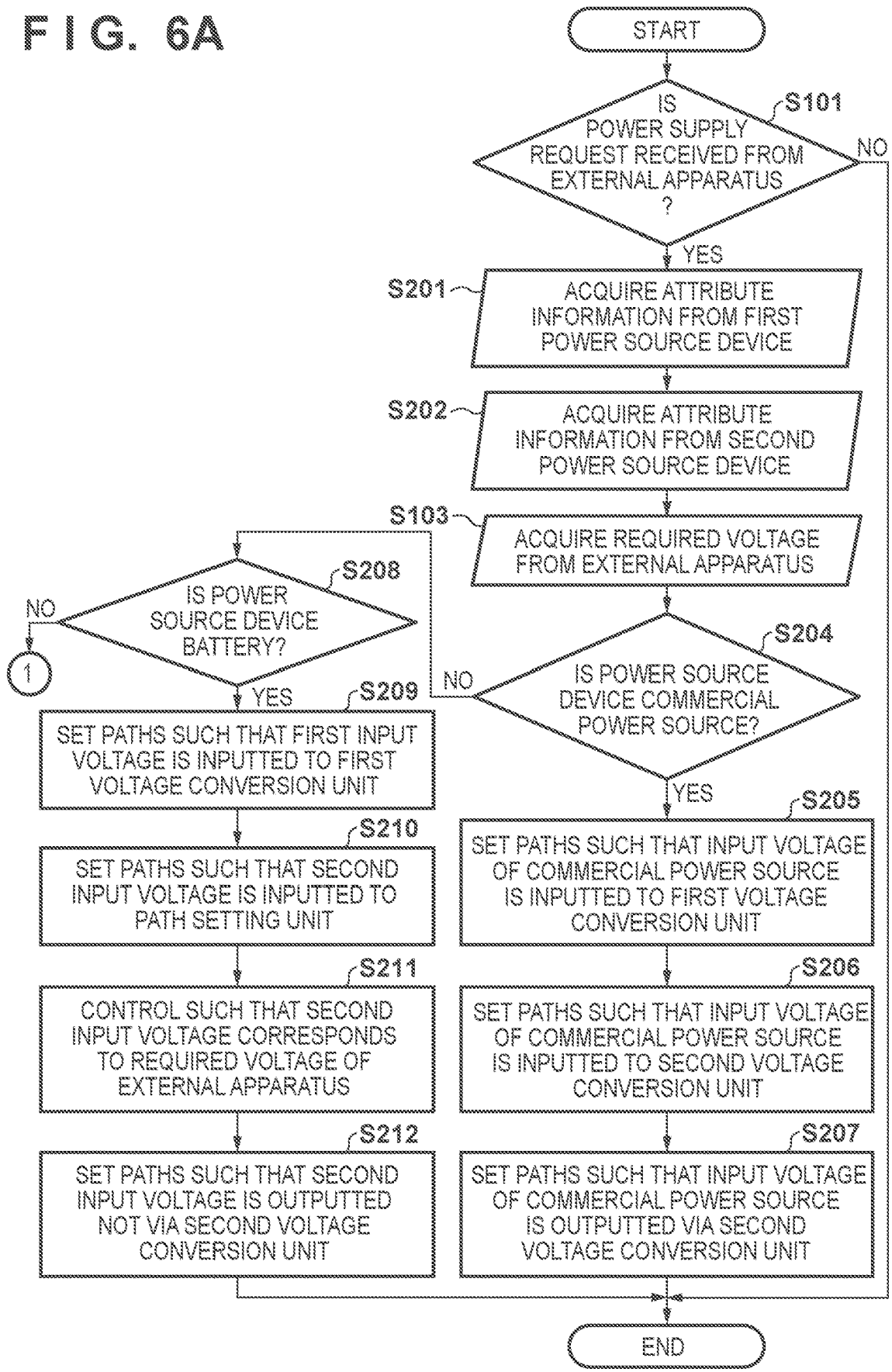
FIGS. 6A and 6B are flowcharts exemplifying control processing according to the second embodiment.
Figure 6B:
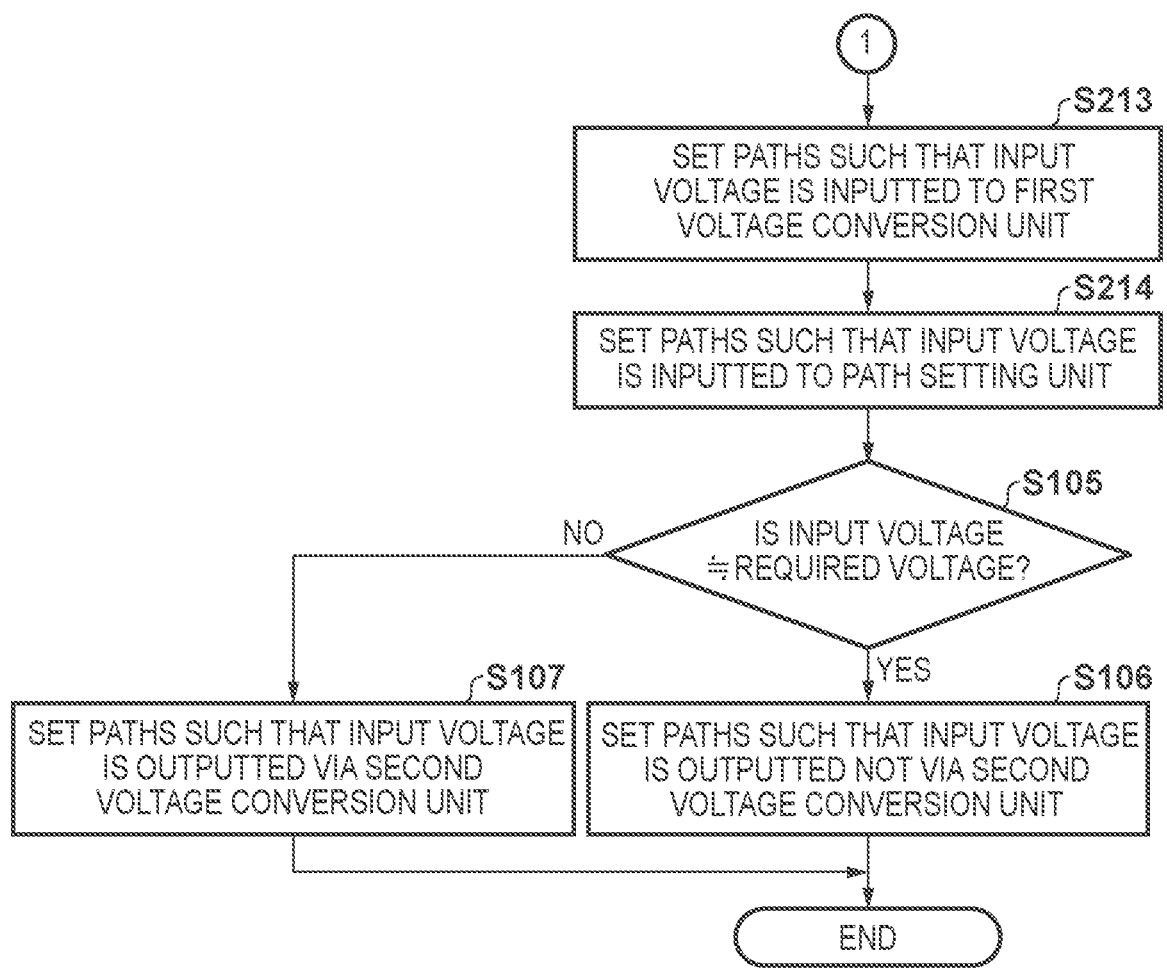

FIGS. 6A and 6B are flowcharts exemplifying power source control processing by the electronic apparatus 100 according to the second embodiment.

The power source control processing according to the second embodiment is realized by the path control unit 117 executing a program stored in the ROM and controlling the path setting unit 116. Note that, at the start of the processing of FIGS. 6A and 6B, the electronic apparatus 100 is connected to the first power source device 201, the second power source device 203 and the external apparatus 202 that are complying with the USB PD standard. Additionally, in the processing of FIGS. 6A and 6B, the same processing as those of FIG. 3 are provided with the same step numbers.

When the path control unit 117 determines in step S101 that a power supply request of the external apparatus 202 is received from the output power control unit 113, the path control unit 117 advances the processing to step S201.

In step S201, the path control unit 117 communicates with the first input power control unit 303 to acquire attribute information of the first power source device 201. The attribute information includes information required for determining whether the first power source device 201 is a commercial power source or a battery.

In step S202, the path control unit 117 communicates with the second input power control unit 304 to acquire attribute information of the second power source device 203. The attribute information includes information required for determining whether the second power source device 203 is a commercial power source or a battery.

In step S103, the path control unit 117 communicates with the output power control unit 113 to acquire the required voltage of the external apparatus 202.

The processing order of step S201, steps S202 and S103 may be arbitrary.

In step S204, the path control unit 117 determines whether or not one of the first power source device 201 connected to the first input terminal 301 or the second power source device 203 connected to the second input terminal 302 is a commercial power source, based on the attribute information acquired in step S201 and S202. When the path control unit 117 determines that one of the first power source device 201 connected to the first input terminal 301 or the second power source device 203 connected to the second input terminal 302 is a commercial power source, the path control unit 117 advances the processing to step S205. When the path control unit 117 does not determine that one of the first power source device 201 connected to the first input terminal 301 or the second power source device 203 connected to the second input terminal 302 is a commercial power source, the path control unit 117 advances the processing to step S208.

In step S205, the path control unit 117 controls the first path switching unit 305 to switch the paths such that the input voltage of the commercial power source is input to the first voltage conversion unit 114.

In step S206, the path control unit 117 controls the second path switching unit 306 to switch the paths such that the input voltage of the commercial power source is input to the path setting unit 116.

In step S207, the path control unit 117 controls the path setting unit 116 to switch the paths such that the input voltage of the commercial power source is output from the output terminal 111 via the second voltage conversion unit 115.

In step S208, the path control unit 117 determines whether or not both of the first power source device 201 connected to the first input terminal 301 and the second power source device 203 connected to the second input terminal 302 are batteries, based on the attribute information acquired in steps S201 and S202. When the path control unit 117 determines that both of the first power source device 201 connected to the first input terminal 301 and the second power source device 203 connected to the second input terminal 302 are batteries, the path control unit 117 advances the processing to step S209. When the path control unit 117 determines that one of the first power source device 201 connected to the first input terminal 301 or the second power source device 203 connected to the second input terminal 302 is not a battery, the path control unit 117 advances the processing to step S213.

In step S209, the path control unit 117 controls the first path switching unit 305 to switch the paths such that the first input voltage of the first input terminal 301 is input to the first voltage conversion unit 114.

In step S210, the path control unit 117 controls the second path switching unit 306 to switch the paths such that the second input voltage of the second input terminal 302 is input to the path setting unit 116.

In step S211, the path control unit 117 controls the second input power control unit 304 to communicate (negotiate) with the second power source device 203 such that the voltage of the second input power corresponds to the required voltage of the external apparatus 202.

Here, the processing order of steps S209, S210, and S211 may be arbitrary.

In step S212, the path control unit 117 controls the path setting unit 116 to switch the paths such that the second input voltage of the second input terminal 302 is output from the output terminal 111 not via the second voltage conversion unit 115.

In step S213, the path control unit 117 controls the first path switching unit 305 to switch the paths such that the input voltage of one of the first input terminal 301 or the second input terminal 302 is input to the first voltage conversion unit 114.

In step S214, the path control unit 117 controls the second path switching unit 306 to switch the paths such that the input voltage of one of the first input terminal 301 or the second input terminal 302 is input to the path setting unit 116.

Here, the processing order of steps S213 and S214 may be reversed.

The processing of step S105, steps S106 and S107 are similar to those described in the first embodiment.

According to the second embodiment, as has been described above, in a case where both of the first power source device 201 and the second power source device 203 are batteries, the input voltage of the second power source device 203 is made to correspond to the required voltage of the external apparatus 202, and the input voltage of the battery is output from the output terminal 111 without performing voltage conversion by the second voltage conversion unit 115. Additionally, in a case where one of the first power source device 201 or the second power source device 203 that is supplying power to the electronic apparatus 100 is a battery and the input voltage of the battery corresponds to the required voltage of the external apparatus 202, the input voltage of the battery is output from the output terminal 111 without performing voltage conversion by the second voltage conversion unit 115. Accordingly, it is possible to suppress power loss due to voltage conversion in outputting the power and reduction of the operating time of the electronic apparatus 100, in a case where the power source of the electronic apparatus 100 is the battery, and therefore it is possible to suppress reduction of the usability.

Third Embodiment

Next, a third embodiment will be described with reference to FIG. 7.

The apparatus configuration of the third embodiment is similar to those of FIG. 4 and FIG. 5 of the second embodiment.

FIG. 7 is a flowchart exemplifying power source control processing by the electronic apparatus 100 according to the third embodiment.

The power source control processing according to the third embodiment is realized by the path control unit 117 executing a program stored in the ROM and controlling the path setting unit 116. Note that, at the start of the processing of FIG. 7, the electronic apparatus 100 is connected to the first power source device 201, the second power source device 203, and the external apparatus 202 that are complying with the USB PD standard. In addition, the processing of FIG. 7 may be executed in parallel with the processing of FIGS. 6A and 6B.

In step S301, the path control unit 117 communicates with the first input power control unit 303 to acquire the attribute information of the first power source device 201, and communicates with the second input power control unit 304 to acquire the attribute information of the first power source device 201. The attribute information includes information required for determining whether the first power source device 201 and the second power source device 203 is a commercial power source or a battery.

The path control unit 117 determines whether or not both of the first power source device 201 connected to the first input terminal 301 and the second power source device 203 connected to the second input terminal 302 are batteries, based on the attribute information acquired from the first power source device 201 and the second power source device 203. When the path control unit 117 determines that both of the first power source device 201 connected to the first input terminal 301 and the second power source device 203 connected to the second input terminal 302 are batteries, the path control unit 117 advances the processing to step S302. When the path control unit 117 determines that one of the first power source device 201 connected to the first input terminal 301 or the second power source device 203 connected to the second input terminal 302 is not a battery, the path control unit 117 terminates the processing.

In step S302, the path control unit 117 communicates with the first input power control unit 303 to acquire the remaining amount information of the first battery which is the first power source device 201. In addition, the path control unit 117 communicates with the second input power control unit 304 to acquire the remaining amount information of the second battery which is the second power source device 203.

In the following description, the first power source device 201 is referred to as a first battery, and the second power source device 203 is referred to as a second battery.

In step S303, the path control unit 117 compares the remaining amount of the first battery and the remaining amount of the second battery acquired in step S302, and determines whether or not the remaining amount of the first battery is equal to or larger than the remaining amount of the second battery. When the path control unit 117 determines that the remaining amount of the first battery is equal to or larger than the remaining amount of the second battery, the path control unit 117 advances the processing to step S304. When the path control unit 117 determines that the remaining amount of the first battery is less than the remaining amount of the second battery, the path control unit 117 advances the processing to step S305.

In step S304, the path control unit 117 controls the first path switching unit 305 and the second path switching unit 306 to switch the paths such that the voltage of the first battery (the first input voltage of the first input terminal 301) is input to the first voltage conversion unit 114, and the voltage of the second battery (the second input voltage of the second input terminal 302) is input to the path setting unit 116, and terminates the processing.

In step S305, the path control unit 117 controls the first path switching unit 305 and the second path switching unit 306 to switch the paths such that the voltage of the second battery (the second input voltage of the second input terminal 302) is input to the first voltage conversion unit 114 and the voltage of the first battery (the first input voltage of the first input terminal 301) is input to the path setting unit 116, and terminates the processing.

According to the third embodiment, as has been described above, in a case where both of the first power source device 201 and the second power source device 203 are batteries, power is supplied to the electronic apparatus 100 from the battery having a larger remaining amount of battery. Accordingly, the operable time of the electronic apparatus 100 can be increased, whereby it is possible to suppress reduction of the usability.

Note that the control processing according to the third embodiment can also be applied to a case where three or more batteries are connected to the electronic apparatus 100. For example, it may be configured such that the remaining amounts of all the batteries connected to the electronic apparatus 100 is compared with each other in step S303, and then the electronic apparatus 100 is supplied the power from the battery having the largest remaining amount, and the external apparatus 202 is supplied the power from the battery having the second largest remaining amount.

In addition, an operation mode for executing the control processing according to the third embodiment may be made selectable by a menu screen or the like.

Fourth Embodiment

Next, a fourth embodiment will be described with reference to FIG. 8.

The apparatus configuration of the fourth embodiment is similar to those of FIG. 4 and FIG. 5 of the second embodiment.

Figure 8:
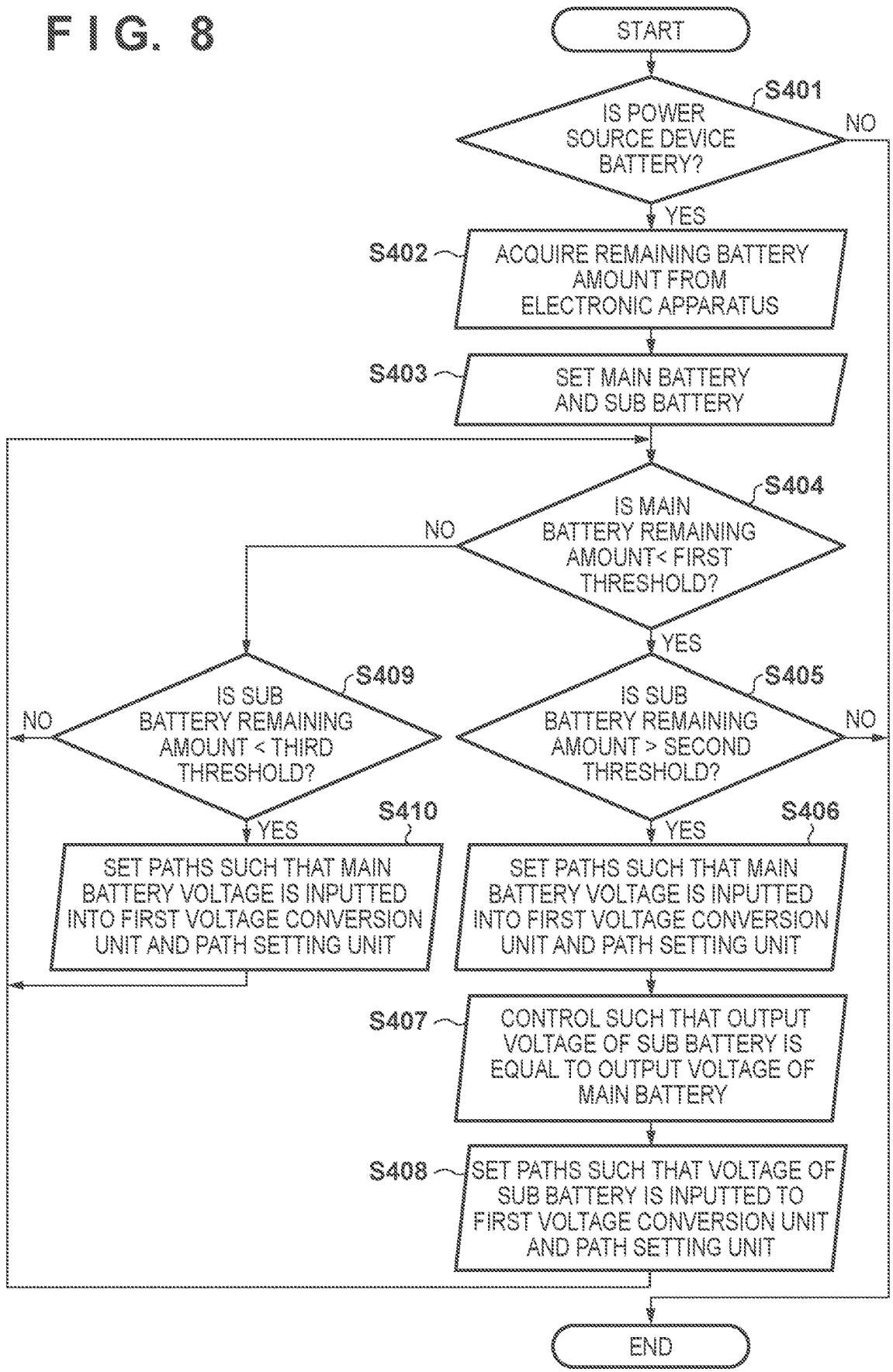
FIG. 8 is a flowchart exemplifying control processing according to a fourth embodiment.

FIG. 8 is a flowchart exemplifying a power source control processing by the electronic apparatus 100 according to the fourth embodiment.

The power source control processing according to the fourth embodiment is realized by the path control unit 117 executing a program stored in the ROM and controlling the path setting unit 116. Note that, at the start of the processing of FIG. 8, the electronic apparatus 100 is connected to the first power source device 201, the second power source device 203, and the external apparatus 202 that are complying with the USB PD standard. In addition, the processing of FIG. 8 may be executed in parallel with the processing of FIGS. 6A, 6B and 7.

In the following description, the first power supply device 201 will be referred to as the first battery and the second power supply device 202 as the second battery. In addition, among the first battery and the second battery, the battery that supplies the power to the electronic apparatus 100 via the first voltage conversion unit 114 will be referred to as a main battery, and the battery that supplies the power to the external apparatus 202 via the path setting unit 116 will be referred to as a sub battery.

The processing of steps S401 and S402 are similar to steps S301 and S302 of FIG. 7.

In step S403, the path control unit 117 sets a first path in which the first battery is the main battery and the second battery is the sub battery, or a second path in which the second battery is the main battery and the first battery is the sub battery. Setting method of the path may be performed such that, for example, the path is preliminarily set in accordance with the input terminal to which the battery is connected, or the path is set based on comparison between the remaining amount of the first battery and the remaining amount of the second battery similarly to the processing of FIG. 7.

In step S404, the path control unit 117 compares the remaining amount of the main battery with a threshold in the first path or the second path set in step S403. When the path control unit 117 determines that the remaining amount of the main battery is smaller than a first threshold, the path control unit 117 advances the processing to step S405, or the path control unit 117 advances the processing to step S409 upon determining that the remaining amount of the main battery is equal to or larger than the first threshold.

In step S405, the path control unit 117 compares the remaining amount of the sub battery with a threshold in the first path or the second path set in step S403. When the path control unit 117 determines that the remaining amount of the sub battery is larger than a second threshold, the path control unit 117 advances the processing to step S406, or the path control unit 117 terminates the processing upon determining that the remaining amount of the sub battery is equal to or smaller than the second threshold.

In step S406, the path control unit 117 controls the first path switching unit 305 and the second path switching unit 306 to switch the paths for the first path and the second path set in step S403 such that the voltage of the main battery is input to the first voltage conversion unit 114 and the path setting unit 116.

In step S407, the path control unit 117 controls the second input power control unit 304 such that the output voltage of the sub battery becomes equal to the output voltage of the main battery.

In step S408, the path control unit 117 controls the first path switching unit 305 and the second path switching unit 306 to switch the paths set in step S406 such that the voltage of the sub battery is input to the first voltage conversion unit 114 and the path setting unit 116, and returns the processing to step S404.

In step S409, the path control unit 117 compares the remaining amount of the sub battery with a threshold in the first path or the second path set in step S403. When the path control unit 117 determines that the remaining amount of the sub battery is smaller than the third threshold, the path control unit 117 advances the processing to step S410, or the path control unit 117 returns the processing to step S404 upon determining that the remaining amount of the sub battery is equal to or larger than the third threshold.

In step S410, the path control unit 117 controls the first path switching unit 305 and the second path switching unit 306 to switch the paths for the first path or the second path set in step S403 such that the voltage of the main battery is input to the first voltage conversion unit 114 and the path setting unit 116, and returns the processing to step S404.

Here, the relation of the first threshold, the second threshold, and the third threshold is such that the second threshold is the largest, the third threshold is the smallest, and the first threshold is larger than the third threshold and smaller than the second threshold (second threshold >first threshold >third threshold). Accordingly, a case where the determination in steps S404 and S405 are both YES is a case where the remaining amount of the main battery is sufficiently smaller than the remaining amount of the sub battery, and therefore the power is supplied to the electronic apparatus 100 and the external apparatus 202 only from the sub battery that has the larger remaining battery amount. On the other hand, a case where the determination in step S404 is NO and the determination in step S409 is YES is a case where the remaining amount of the sub battery is sufficiently smaller than the remaining amount of the main battery, and therefore the power is supplied to the electronic apparatus 100 and the external apparatus 202 only from the main battery that has the larger remaining amount of battery.

Here, before the paths are switched to supply power to the electronic apparatus 100 and the external apparatus 202 only from the sub battery that has the larger remaining amount of battery in step S408, the paths are switched to supply the power to the electronic apparatus 100 and the external apparatus 202 only from the main battery that has the smaller remaining amount of battery in step S406, the purpose of these processing is to prevent momentary cut-off of power supply in switching the battery for supplying power to the electronic apparatus 100 and the external apparatus 202 from the main battery to the sub battery.

According to the fourth embodiment, as has been described above, when both of the first power source device 201 and the second power source device 203 are batteries and the batteries respectively supply power to the electronic apparatus 100 and the external apparatus 202 in a shared manner, the power is supplied to the electronic apparatus 100 and the external apparatus 202 only from the battery having the larger remaining amount of battery in a situation where the remaining amount of battery of one battery is sufficiently large and the remaining amount of battery of the other battery is sufficiently small. Accordingly, it is possible to effectively utilize the power of a plurality of batteries, increase the time during which the electronic apparatus 100 and the external apparatus 202 can simultaneously operate, and suppress reduction of the usability.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2023-025530, filed Feb. 21, 2023, and 2023-201026, filed Nov. 28, 2023, each of which are hereby incorporated by reference herein in their entirety.

What is claimed is:

1. An electronic apparatus comprising:
   a connection unit that connects to a power source device and an external apparatus;
   a power control unit that controls power input from the power source device and power output to the external apparatus;
   a voltage conversion unit that steps up or steps down voltage of the power input from the power source device;
   a setting unit that sets a path through which the power input from the power source device is output to the external apparatus; and
   a control unit that acquires attribute information of the power source device and required voltage of the external apparatus and, performs control, based on the attribute information and the required voltage, to switch between a path through which the power input from the power source device is output to the external apparatus via the voltage conversion unit, and a path through which the power input from the power source device is output to the external apparatus not via the voltage conversion unit, wherein the power source device includes a first power source device and a second power source device, wherein the connection unit includes a first input terminal connected to the first power source device, a second input terminal connected to the second power source device, and an output terminal connected to the external apparatus, wherein the voltage conversion unit includes a first voltage conversion unit that converts first input voltage of the first input terminal into voltage required for operating a component of the electronic apparatus and converts second input voltage of the second input terminal into voltage required for operating a component of the electronic apparatus, and a second voltage conversion unit that converts the first input voltage of the first input terminal into output voltage of the output terminal and converts second input voltage of the second input terminal into output voltage of the output terminal, and wherein the control unit performs control to switch to a path through which the first input voltage of the first input terminal or the second input voltage of the second input terminal is output to the output terminal via the second voltage conversion unit, or to a path through which the first input voltage of the first input terminal or the second input voltage of the second input terminal is output to the output terminal not via the second voltage conversion unit.

2. The device according to claim 1, comprising:

a first path switching unit that switches a path such that the first input voltage of the first input terminal or the second input voltage of the second input terminal is output to the first voltage conversion unit; and a second path switching unit that switches a path such that the first input voltage of the first input terminal or the second input voltage of the second input terminal is output to the second voltage conversion unit via the setting unit, wherein the control unit performs control to switch to a path through which the first input voltage of the first input terminal or the second input voltage of the second input terminal input to the setting unit is output to the output terminal via the second voltage conversion unit, or to a path through which the first input voltage of the first input terminal or the second input voltage of the second input terminal input to the setting unit is output to the output terminal not via the second voltage conversion unit.

3. The device according to claim 2, wherein, the control unit controls, when the first power source device and the second power source device are batteries, the first path switching unit and the second path switching unit to switch to a path through which the first input voltage is input to the first voltage conversion unit and the second input voltage is input to the setting unit, controls the power control unit such that the second input voltage corresponds to the required voltage, and performs control to switch to a path through which the second input voltage is output to the output terminal not via the second voltage conversion unit.

4. The device according to claim 2, wherein, the control unit controls, when the first power source device or the second power source device is a battery, the first path switching unit and the second path switching unit to switch to a path through which input voltage of the battery is input to the first voltage conversion unit and the setting unit, switches to a path through which the input voltage of the battery is output to the output terminal not via the second voltage conversion unit, when the input voltage of the battery corresponds to the required voltage, and performs control to switch to a path through which the input voltage of the battery is output to the output terminal via the second voltage conversion unit, when the input voltage of the battery and the required voltage are different.

5. The device according to claim 2, wherein, the control unit controls, when the first power source device or the second power source device is a commercial power source, the first path switching unit and the second path switching unit to switch to a path through which input voltage of the commercial power source is input to the first voltage conversion unit and the setting unit, and performs control to switch to a path through which the input voltage of the commercial power source is output to the output terminal via the second voltage conversion unit.

6. The device according to claim 2, wherein, the control unit controls, when the first power source device and the second power source device are batteries, the first path switching unit and the second path switching unit to switch to a path through which voltage of the first battery is input to the first voltage conversion unit and voltage of the second battery is input to the setting unit, or to a path through which the voltage of the second battery is input to the first voltage conversion unit and the voltage of the first battery is input to the setting unit, based on power that can be supplied by the first battery which is the first power source device, and power that can be supplied by the second battery which is the second power source device.

7. The device according to claim 6, wherein, the control unit controls, when a remaining amount of the first battery is equal to or larger than a remaining amount of the second battery, the first path switching unit and the second path switching unit to switch to a path through which the voltage of the first battery is input to the first voltage conversion unit and the voltage of the second battery is input to the setting unit.

8. The device according to claim 6, wherein, the control unit controls, when a remaining amount of the first battery is smaller than a remaining amount of the second battery, the first path switching unit and the second path switching unit to switch to a path through which the voltage of the second battery is input to the first voltage conversion unit and the voltage of the first battery is input to the setting unit.

9. The device according to claim 2, wherein, the control unit sets, when the first power source device and the second power source device are batteries, a first path through which voltage of a first battery that is the first power source device is input to the first voltage conversion unit and voltage of a second battery that is the second power source device is input to the setting unit, in which the first battery serves as a main battery and the second battery serves as a sub battery, or a second path through which the voltage of the second battery is input to the first voltage conversion unit and the voltage of a first battery is input to the setting unit, in which the second battery serves as the main battery and the first battery serves as the sub battery, and the control unit controls, when a remaining amount of the main battery is smaller than a first threshold and a remaining amount of the sub battery is larger than a second threshold that is larger than the first threshold, the first path switching unit and the second path switching unit such that the voltage of the sub battery is input to the first voltage conversion unit and the setting unit.

10. The device according to claim 9, wherein, the control unit controls, when the remaining amount of the main battery is smaller than the first threshold and the remaining amount of the sub battery is larger than the second threshold, the first path switching unit and the second path switching unit such that the voltage of the main battery is input to the first voltage conversion unit and the setting unit, and subsequently controls the first path switching unit and the second path switching unit such that the voltage of the sub battery is input to the first voltage conversion unit and the setting unit.

11. The device according to claim 10, wherein, the control unit controls, when the remaining amount of the main battery is smaller than the first threshold and the remaining amount of the sub battery is larger than the second threshold, the first path switching unit and the second path switching unit such that the voltage of the main battery is input to the first voltage conversion unit and the setting unit, sets the output voltage of the second battery to be equal to the output voltage of the first battery, and subsequently controls the first path switching unit and the second path switching unit such that the voltage of the sub battery is input to the first voltage conversion unit and the setting unit.

12. The device according to claim 9, wherein, the control unit controls, when the remaining amount of the main battery is equal to or larger than the first threshold and the remaining amount of the sub battery is smaller than a third threshold that is smaller than the first threshold, the first path switching unit and the second path switching unit such that the voltage of the main battery is input to the first voltage conversion unit and the setting unit.

13. A method of controlling an electronic apparatus, wherein the electronic apparatus includes
 a connection unit that connects to a power source device and an external apparatus;
 a power control unit that controls power input from the power source device and power output to the external apparatus;
 a voltage conversion unit that steps up or steps down voltage of the power input from the power source device; and
 a setting unit that sets a path through which the power input from the power source device is output to the external apparatus,
 wherein the power source device includes a first power source device and a second power source device,
 wherein the connection unit includes a first input terminal connected to the first power source device, a second input terminal connected to the second power source device, and an output terminal connected to the external apparatus,
 wherein the voltage conversion unit includes a first voltage conversion unit that converts first input voltage of the first input terminal into voltage required for operating a component of the electronic appara-
 tus and converts second input voltage of the second input terminal into voltage required for operating a component of the electronic apparatus, and a second voltage conversion unit that converts the first input voltage of the first input terminal into output voltage of the output terminal and converts second input voltage of the second input terminal into output voltage of the output terminal, wherein the method comprises:
 acquiring attribute information of the power source device and a required voltage of the external apparatus; and,
 controlling, based on the attribute information and the required voltage, to switch between a path through which the power input from the power source device is output to the external apparatus via the voltage conversion unit, and a path through which the power input from the power source device is output to the external apparatus not via the voltage conversion unit,
 wherein the controlling performs control to switch to a path through which the first input voltage of the first input terminal or the second input voltage of the second input terminal is output to the output terminal via the second voltage conversion unit, or to a path through which the first input voltage of the first input terminal or the second input voltage of the second input terminal is output to the output terminal not via the second voltage conversion unit.

14. A non-transitory computer-readable storage medium storing a program for causing a computer to function as an electronic apparatus comprising:
 a connection unit that connects to a power source device and an external apparatus;
 a power control unit that controls power input from the power source device and power output to the external apparatus;
 a voltage conversion unit that steps up or steps down voltage of the power input from the power source device;
 a setting unit that sets a path through which the power input from the power source device is output to the external apparatus; and
 a control unit that acquires attribute information of the power source device and required voltage of the external apparatus and, performs control, based on the attribute information and the required voltage, to switch between a path through which the power input from the power source device is output to the external apparatus via the voltage conversion unit, and a path through which the power input from the power source device is output to the external apparatus not via the voltage conversion unit,
 wherein the power source device includes a first power source device and a second power source device,
 wherein the connection unit includes a first input terminal connected to the first power source device, a second input terminal connected to the second power source device, and an output terminal connected to the external apparatus,
 wherein the voltage conversion unit includes a first voltage conversion unit that converts first input voltage of the first input terminal into voltage required for operating a component of the electronic apparatus and converts second input voltage of the second input terminal into voltage required for operating a component of the electronic apparatus, and a second voltage conversion unit that converts the first input voltage of the first input terminal into output voltage of the output terminal and converts second input voltage of the second input terminal into output voltage of the output terminal, and wherein the control unit performs control to switch to a path through which the first input voltage of the first input terminal or the second input voltage of the second input terminal is output to the output terminal via the second voltage conversion unit, or to a path through which the first input voltage of the first input terminal or the second input voltage of the second input terminal is output to the output terminal not via the second voltage conversion unit.

* * * * *